(12) United States Patent
Ueno et al.

(10) Patent No.: US 12,057,549 B2
(45) Date of Patent: Aug. 6, 2024

(54) SOLID ELECTROLYTE MATERIAL AND BATTERY USING THE SAME

(71) Applicant: Panasonic Intellectual Property Management Co., Ltd., Osaka (JP)

(72) Inventors: Koki Ueno, Osaka (JP); Yoshiaki Tanaka, Kyoto (JP); Kazuhide Ichikawa, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 553 days.

(21) Appl. No.: 17/338,670

(22) Filed: Jun. 4, 2021

(65) Prior Publication Data

US 2021/0296692 A1    Sep. 23, 2021

Related U.S. Application Data

(63) Continuation of application No. PCT/JP2019/046737, filed on Nov. 29, 2019.

(30) Foreign Application Priority Data

Dec. 28, 2018 (JP) .................. 2018-248585
Dec. 28, 2018 (JP) .................. 2018-248586
(Continued)

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0407* (2013.01); *H01M 10/0525* (2013.01);
(Continued)

(58) Field of Classification Search
CPC ...... C01B 25/455; C01G 33/00; C01G 35/02; H01B 1/06; H01B 1/08; H01B 1/14;
(Continued)

(56) References Cited

U.S. PATENT DOCUMENTS

2004/0151986 A1    8/2004   Park et al.
2012/0301796 A1    11/2012  Ohtomo et al.
(Continued)

FOREIGN PATENT DOCUMENTS

CN    102780031 B    3/2016
CN    107431242 A    12/2017
(Continued)

OTHER PUBLICATIONS

International Search Report of PCT application No. PCT/JP2019/046737 dated Feb. 10, 2020.
(Continued)

*Primary Examiner* — Lingwen R Zeng
(74) *Attorney, Agent, or Firm* — Rimon P.C.

(57) ABSTRACT

A solid electrolyte material comprises a crystal structure including a structure framework and an ion-conductive species. The structure framework has a one-dimensional chain. In the one-dimensional chain, a plurality of polyhedrons are linearly connected to each other while sharing a corner, and each of the plurality of polyhedrons contains at least one type of cation and at least one type of anion.

8 Claims, 4 Drawing Sheets

(30) Foreign Application Priority Data

| Jul. 4, 2019 | (JP) | 2019-125548 |
|---|---|---|
| Aug. 30, 2019 | (JP) | 2019-159080 |
| Oct. 17, 2019 | (JP) | 2019-190374 |

(51) Int. Cl.

| *H01M 10/0525* | (2010.01) |
|---|---|
| *C01B 25/455* | (2006.01) |
| *C01G 33/00* | (2006.01) |
| *C01G 35/02* | (2006.01) |
| *H01B 1/06* | (2006.01) |
| *H01B 1/08* | (2006.01) |
| *H01B 1/14* | (2006.01) |
| *H01M 4/02* | (2006.01) |

(52) U.S. Cl.
CPC ............ *C01B 25/455* (2013.01); *C01G 33/00* (2013.01); *C01G 35/02* (2013.01); *H01B 1/06* (2013.01); *H01B 1/08* (2013.01); *H01B 1/14* (2013.01); *H01M 2004/027* (2013.01); *H01M 2004/028* (2013.01); *H01M 2300/0068* (2013.01); *H01M 2300/008* (2013.01); *Y02E 60/10* (2013.01)

(58) Field of Classification Search
CPC ......... H01M 10/0525; H01M 10/0562; H01M 2004/027; H01M 2004/028; H01M 2300/0068; H01M 2300/008; H01M 4/0407; H01M 4/62; Y02E 60/10
See application file for complete search history.

(56) References Cited

U.S. PATENT DOCUMENTS

| 2014/0147753 | A1* | 5/2014 | Homma | ............... H01M 10/052 423/276 |
|---|---|---|---|---|
| 2017/0162902 | A1 | 6/2017 | Ohta et al. | |
| 2018/0076452 | A1 | 3/2018 | Sasaki et al. | |
| 2021/0242494 | A1 | 8/2021 | Tanaka et al. | |
| 2021/0249683 | A1 | 8/2021 | Tanaka et al. | |

FOREIGN PATENT DOCUMENTS

| JP | 10-316424 A | 12/1998 |
|---|---|---|
| JP | 2004-235155 | 8/2004 |
| JP | 2006-156284 A | 6/2006 |
| JP | 2006-244734 | 9/2006 |
| JP | 2011-014445 | 1/2011 |
| JP | 2011-129312 | 6/2011 |
| JP | 2012-054071 A | 3/2012 |
| JP | 2020-137153 A1 | 11/2021 |
| JP | 2020-137155 A1 | 11/2021 |

OTHER PUBLICATIONS

Yutao Li et al., "High lithium ion conduction in garnet-type Li6La3ZrTaO12", Electrochemistry Communications 13, 2011, pp. 1289-1292.
Haomin Chen et al., "SoftBV—a software tool for screening the materials genome of inorganic fast ion conductors", Acta Cryst. (2019). B75, pp. 18-33.
English Translation of Chinese Search Report dated Jun. 10, 2023 for the related Chinese Patent Application No. 201980062289.0.
The Extended European Search Report dated Feb. 4, 2022 for the related European Patent Application No. 19901589.2.
The Extended European Search Report dated Feb. 4, 2022 for the related European Patent Application No. 19904950.3.
Yongjia Zhang et al: "Magnetic Properties in ${\rm Li}_{1-{\rm x}}{\rm A}_{\rm x}{\rm NbO}_{3}$ ( ${\rm A}={\rm Ca}$ , Sr, and Ba) and ${\rm LiNbO}_{3-{\rm y}}{\rm M}_{\rm y}$ ( ${\rm M}={\rm F}$ , Cl, and Br) From First-Principles Study", IEEE Transactions on Magnetics, IEEE, USA, vol. 47, No. 10, Oct. 1, 2011 (Oct. 1, 2011), pp. 2916-2919, XP011383605.
Phraewphiphat Thanya et al: "Synthesis and Lithium-Ion Conductivity of LiSrB2O6F (B=Nb5+, Ta5+) with a Pyrochlore Structure", Journal of the Japan Society of Powder and Powder Metallurgy, Funtai Funmatsu Yakin Kyokai, JP vol. 65, No. 1 Feb. 3, 2018 (Feb. 3, 2018), pp. 26-33, XP009531967, ISSN: 0532-8799, DOI: 10.2497/JJSPM.65.26 Retrieved from the Internet: URL:https://www.jstage.jst.go.jp/article/jspm/65/1/65_26/_pdf/- char/en.
English Translation of Chinese Search Report dated Aug. 6, 2023 for the related Chinese Patent Application No. 201980074838.6.
The Indian Office Action dated Jan. 24, 2023 for the related Indian Patent Application No. 202147018165.

* cited by examiner

SOLID ELECTROLYTE MATERIAL AND BATTERY USING THE SAME

BACKGROUND

1. Technical Field

The present disclosure relates to a solid electrolyte material and a battery using the same.

2. Description of the Related Art

Japanese Unexamined Patent Application Publication No. 2011-129312 discloses an all-solid battery in which a sulfide solid electrolyte is used. Japanese Unexamined Patent Application Publication No. 2006-244734 discloses an all-solid battery in which a halide solid electrolyte containing indium is used.

SUMMARY

One non-limiting and exemplary embodiment provides a solid electrolyte material having high lithium ion conductivity.

In one general aspect, the techniques disclosed here feature a solid electrolyte material having a crystal structure including a structure framework and an ion-conductive species, wherein the structure framework has a one-dimensional chain in which a plurality of polyhedrons are linearly connected to each other while sharing a corner, and each of the plurality of polyhedrons contains at least one type of cation and at least one type of anion.

The present disclosure provides a solid electrolyte material having high ionic conductivity.

Additional benefits and advantages of the disclosed embodiments will become apparent from the specification and drawings. The benefits and/or advantages may be individually obtained by the various embodiments and features of the specification and drawings, which need not all be provided to obtain one or more of such benefits and/or advantages.

DETAILED DESCRIPTION

Figure 1:
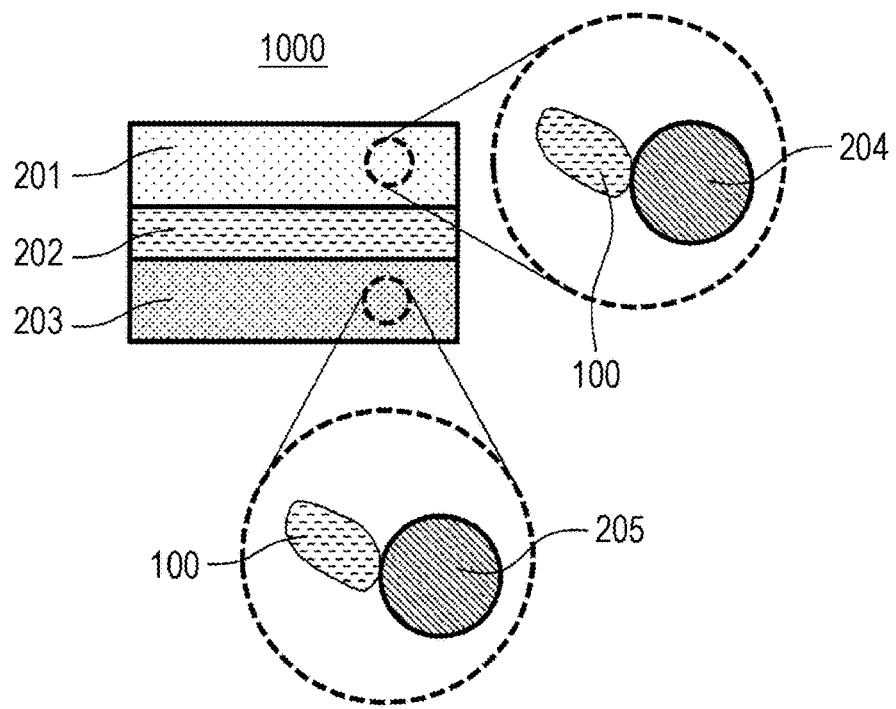
FIG. 1 is a sectional view of a battery 1000 according to a second embodiment.

The embodiments according to the present disclosure will be described below with reference to the drawings.

First Embodiment

The solid electrolyte material according to the first embodiment has a crystal structure including a structure framework and an ion-conductive species. The structure framework has a one-dimensional chain in which a plurality of polyhedrons are linearly connected to each other while sharing a corner. Each of the plurality of polyhedrons contains at least one type of cation and at least one type of anion.

The solid electrolyte material according to the first embodiment has high ionic conductivity. Consequently, the solid electrolyte material according to the first embodiment can be used for obtaining a battery having excellent charge-discharge characteristics. An example of the battery is an all-solid secondary battery.

A polyhedron is formed from a cation and all anions bonded to the cation. The cation is arranged inside the polyhedron, and the anions are arranged at the corners of the polyhedron. When the distance between an anion and the cation is less than 1.2 times the sum of the atomic radius of the cation and the atomic radius of the anion, the cation is assumed to be bonded to the anion.

The one-dimensional chain in the present disclosure is a structure in which a plurality of polyhedrons are linearly connected to each other while sharing a corner. Hereafter, an anion arranged at the corner is also referred to as a shared anion.

The structure framework of the solid electrolyte material consisting of the one-dimensional chain decreases the filling ratio of the crystal structure (that is, the volume ratio of the constituent elements to the entire crystal structure). This is because, in the structure framework consisting of the one-dimensional chain, the distance between an atom constituting one polyhedron and an atom constituting another polyhedron increases compared with a structure framework composed of a two-dimensional chain or a three-dimensional chain. In the crystal structure having a low filling ratio, the number of atoms that hinder ionic conduction of the ion-conductive species is small. That is, the ionic conduction path of the ion-conductive species is wide. Further, since the distance between the ion-conductive species and the anion constituting the structure framework is large, electrostatic interaction between the ion-conductive species and the anion is small. As a result of these, the ionic conductivity of the solid electrolyte material increases.

In the case in which a plurality of polyhedrons share a corner with each other, a space between the polyhedrons is large compared with the case in which a face or an edge is shared. That is, the filling ratio of the crystal structure decreases. Consequently, the conduction path of the ion-conductive species is widened, and the ionic conductivity of the solid electrolyte material is further enhanced.

The shared anions may be one type or two or more types. In the case in which the shared anions are one type, the bonding distances between the cation and the respective shared anions are substantially equal to each other. As a result, distortion of the polyhedron decreases, and the polyhedron has a shape close to a regular polyhedron. Consequently, the polyhedron can more stably exist.

It is desirable that sulfur not be contained in the solid electrolyte material according to the first embodiment. A solid electrolyte material not containing sulfur has excellent safety since hydrogen sulfide is not generated even in the case of exposure to air. It should be noted that hydrogen sulfide may be generated when the sulfide solid electrolyte material disclosed in Japanese Unexamined Patent Application Publication No. 2011-129312 is exposed to air.

The polyhedron may be a tetrahedron or an octahedron. Such a polyhedron tends to form a one-dimensional chain.

To form a one-dimensional chain having reduced distortion, the polyhedron may be an octahedron.

The anions constituting the polyhedron may be one type or two or more types. In the case in which the polyhedron contains two or more types of anions, the polyhedron can realize various shapes. As a result, the stability and the ionic conductivity of the solid electrolyte material can be improved. In the case in which the shared anions are one type and in which anions other than the shared anions are anions different from the shared anions, the polyhedron has a shape close to a regular polyhedron and the stability of the solid electrolyte material is improved. In the case in which the shared anions are two or more types, the polyhedron has a shape like a distorted regular polyhedron. As a result, the stability of the solid electrolyte material may be deteriorated, but the filling ratio of the crystal structure may be decreased due to the above-described distortion. Accordingly, the solid electrolyte material has high ionic conductivity.

The polyhedron may be composed of at least one cation selected from the group consisting of Nb, Ta, and P and at least one anion selected from the group consisting of O, F, Cl, Br, and I. The solid electrolyte material composed of such a polyhedron has high ionic conductivity.

The ion-conductive species may be a lithium ion. A lithium ion has a small ionic radius and, therefore, readily passes through a crystal.

There is no particular limitation regarding the shape of the solid electrolyte material according to the first embodiment. Examples of the shape include needle-like shapes, spherical shapes, and ellipsoidal shapes. The solid electrolyte material according to the first embodiment may be particles. The solid electrolyte material according to the first embodiment may be formed so as to have the shape of pellets or plates.

For example, in the case in which the shape of the solid electrolyte material according to the first embodiment is granular (for example, spherical), the solid electrolyte material may have a median diameter greater than or equal to 0.1 µm and less than or equal to 100 µm. Desirably, the median diameter may be greater than or equal to 0.5 µm and less than or equal to 10 µm. Consequently, the solid electrolyte material according to the first embodiment has higher ionic conductivity. Further, the solid electrolyte material according to the first embodiment and other materials may be favorably dispersed.

To favorably disperse the solid electrolyte material according to the first embodiment and an active material, the solid electrolyte material according to the first embodiment may have a smaller median diameter than the active material.

The solid electrolyte material according to the first embodiment may further have a different crystal phase.

The crystal structure of the solid electrolyte material is evaluated by Rietveld analysis. Rietveld analysis is a method for determining the crystal structure of a target sample mainly on the basis of the diffraction peak angle and the intensity of a diffraction pattern obtained by using an X-ray diffraction method. Regarding the Rietveld method, the method described in, for example, Chapter 7, Chapter 8, and Chapter 9 of "Funmatsu Xsen Kaiseki no Jissai (Practice of Powder X-ray Analysis), second edition, (Asakura Publishing Co., Ltd., edited by NAKAI Izumi and IZUMI Fujio) is used. Specifically, the X-ray diffraction pattern of the solid electrolyte material of the analysis target is measured by using a θ-2θ method in the range in which the diffraction angle 2θ is greater than or equal to 10° and less than or equal to 80°. The resulting X-ray diffraction pattern is subjected to Rietveld analysis by using the RIETAN-2000 program. The reliability of the analysis result is evaluated on the basis of, for example, an $R_{wp}$ value. Method for producing solid electrolyte material The solid electrolyte material according to the first embodiment is produced by using, for example, the following method.

Raw material powders are mixed so as to have a predetermined composition. Examples of the raw material powder include halides, oxides, hydroxides, and acid halides. The raw material powders may be mixed at a molar ratio adjusted in advance so as to negate a composition change that may occur during the synthesis process.

The raw material powders are made to mechanochemically react with each other in a mixer such as a planetary ball mill (that is, through a mechanochemical milling method) so as to produce a product.

In this manner, the solid electrolyte material according to the first embodiment is obtained.

Second Embodiment

A second embodiment will be described below. Matters described in the first embodiment may be appropriately omitted.

A battery according to the second embodiment includes a positive electrode, an electrolyte layer, and a negative electrode. The electrolyte layer is arranged between the positive electrode and the negative electrode.

At least one selected from the group consisting of the positive electrode, the electrolyte layer, and the negative electrode contains the solid electrolyte material according to the first embodiment. The battery according to the second embodiment contains the solid electrolyte material according to the first embodiment and, therefore, has high charge-discharge characteristics.

A specific example of the battery according to the second embodiment will be described below.

FIG. 1 is a sectional view of a battery 1000 according to the second embodiment.

The battery 1000 includes a positive electrode 201, an electrolyte layer 202, and a negative electrode 203. The electrolyte layer 202 is arranged between the positive electrode 201 and the negative electrode 203.

The positive electrode 201 includes positive electrode active material particles 204 and solid electrolyte particles 100.

The electrolyte layer 202 contains an electrolyte material (for example, a solid electrolyte material).

The negative electrode 203 contains negative electrode active material particles 205 and solid electrolyte particles 100.

The solid electrolyte particle 100 is a particle composed of the solid electrolyte material according to the first embodiment or a particle containing the solid electrolyte material according to the first embodiment as a primary component. The particle containing the solid electrolyte material according to the first embodiment as a primary component is a particle in which a component contained in the largest amount is the solid electrolyte material according to the first embodiment.

The positive electrode 201 contains a material capable of occluding and releasing metal ions (for example, lithium ions). The material is, for example, a positive electrode active material (for example, the positive electrode active material particles 204).

Examples of the positive electrode active material include lithium-containing transition metal oxides, transition metal fluorides, polyanions, fluorized polyanionic materials, transition metal sulfides, transition metal oxyfluorides, transition metal oxysulfides, and transition metal oxynitrides. An example of the lithium-containing transition metal oxide is $Li(NiCoAl)O_2$, $LiCoO_2$, or $Li(NiCoMn)O_2$.

The positive electrode active material particles 204 may have a median diameter greater than or equal to 0.1 μm and less than or equal to 100 μm. In the case in which the positive electrode active material particles 204 have a median diameter greater than or equal to 0.1 μm, in the positive electrode, the positive electrode active material particles 204 and the solid electrolyte particles 100 can be favorably dispersed. Consequently, the charge-discharge characteristics of the battery are improved. In the case in which the positive electrode active material particles 204 have a median diameter less than or equal to 100 μm, the lithium diffusion rate in the positive electrode active material particles 204 is increased. Consequently, the battery can function with a high output.

The positive electrode active material particles 204 may have a greater median diameter than the solid electrolyte particles 100. Consequently, the positive electrode active material particles 204 and the solid electrolyte particles 100 can be favorably dispersed.

From the viewpoint of the energy density and the output of the battery, in the positive electrode 201, the ratio of the volume of the positive electrode active material particles 204 to the total of the volume of the positive electrode active material particles 204 and the volume of the solid electrolyte particles 100 may be greater than or equal to 0.30 and less than or equal to 0.95.

From the viewpoint of the energy density and the output of the battery, the thickness of the positive electrode 201 may be greater than or equal to 10 μm and less than or equal to 500 μm.

The electrolyte layer 202 contains an electrolyte material. The electrolyte material is, for example, a solid electrolyte material. The electrolyte layer 202 may be a solid electrolyte layer.

The electrolyte layer 202 may be composed of just the solid electrolyte material according to the first embodiment.

The electrolyte layer 202 may be composed of just a solid electrolyte material different from the solid electrolyte material according to the first embodiment. Examples of the solid electrolyte material different from the solid electrolyte material according to the first embodiment include $Li_2MgX'_4$, $Li_2FeX'_4$, $Li(Al, Ga, In)X'_4$, $Li_3(Al, Ga, In)X'_6$, and $LiI$. Here, X' is at least one element selected from the group consisting of F, Cl, Br, and I.

Hereafter, the solid electrolyte material according to the first embodiment is referred to as a first solid electrolyte material. The solid electrolyte material different from the solid electrolyte material according to the first embodiment is referred to as a second solid electrolyte material.

The electrolyte layer 202 may contain not only the first solid electrolyte material but also the second solid electrolyte material. In the electrolyte layer 202, the first solid electrolyte material and the second solid electrolyte material may be uniformly dispersed.

A layer composed of the first solid electrolyte material and a layer composed of the second solid electrolyte material may be stacked in the stacking direction of the battery 1000.

The electrolyte layer 202 may have a thickness greater than or equal to 1 μm and less than or equal to 1,000 μm. In the case in which the electrolyte layer 202 has a thickness greater than or equal to 1 μm, a short circuit between the positive electrode 201 and the negative electrode 203 does not readily occur. In the case in which the electrolyte layer 202 has a thickness less than or equal to 1,000 μm, the battery can function with a high output.

The negative electrode 203 contains a material capable of occluding and releasing metal ions (for example, lithium ions). The material is, for example, a negative electrode active material (for example, the negative electrode active material particles 205).

Examples of the negative electrode active material include metal materials, carbon materials, oxides, nitrides, tin compounds, and silicon compounds. The metal material may be a simple metal or an alloy. Examples of the metal material include lithium metal and lithium alloys. Examples of the carbon material include natural graphite, coke, graphitizing carbon, carbon fiber, spherical carbon, artificial carbon, and amorphous carbon. From the viewpoint of the capacity density, favorable examples of the negative electrode active material include silicon (that is, Si), tin (that is, Sn), silicon compounds, and tin compounds.

The negative electrode active material particles 205 may have a median diameter greater than or equal to 0.1 μm and less than or equal to 100 μm. In the case in which the negative electrode active material particles 205 have a median diameter greater than or equal to 0.1 μm, in the negative electrode 203, the negative electrode active material particles 205 and the solid electrolyte particles 100 can be favorably dispersed. Consequently, the charge-discharge characteristics of the battery are improved. In the case in which the negative electrode active material particles 205 have a median diameter less than or equal to 100 μm, the lithium diffusion rate in the negative electrode active material particles 205 is improved. Consequently, the battery can function with a high output.

The negative electrode active material particles 205 may have a greater median diameter than the solid electrolyte particles 100. Consequently, the negative electrode active material particles 205 and the solid electrolyte particles 100 can be favorably dispersed.

From the viewpoint of the energy density and the output of the battery, in the negative electrode 203, the ratio of the volume of the negative electrode active material particles 205 to the total of the volume of the negative electrode active material particles 205 and the volume of the solid electrolyte particles 100 may be greater than or equal to 0.30 and less than or equal to 0.95.

From the viewpoint of the energy density and the output of the battery, the negative electrode 203 may have a thickness greater than or equal to 10 μm and less than or equal to 500 μm.

For the purpose of enhancing the ionic conductivity, chemical stability, and electrochemical stability, at least one selected from the group consisting of the positive electrode 201, the electrolyte layer 202, and the negative electrode 203 may contain the second solid electrolyte material.

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte include
(i) NASICON-type solid electrolytes such as $LiTi_2(PO_4)_3$ or element substitution products thereof,
(ii) Perovskite-type solid electrolytes such as $(LaLi)TiO_3$,
(iii) LISICON-type solid electrolytes such as $Li_{14}ZnGe_4O_{16}$, $Li_4SiO_4$, or $LiGeO_4$ or element substitution products thereof,
(iv) Garnet-type solid electrolytes such as $LizLa_3Zr_2O_{12}$ or element substitution products thereof, and
(v) $Li_3PO_4$ or N-substitution products thereof.

The second solid electrolyte material may be an organic polymer solid electrolyte.

Examples of the organic polymer solid electrolyte include compounds of a polymer compound and a lithium salt. The polymer compound may have an ethylene oxide structure. Since the polymer compound having an ethylene oxide structure can contain a large amount of lithium salt, the ionic conductivity can be further enhanced.

Examples of the lithium salt include $LiPF_6$, $LiBF_4$, $LiSbF_6$, $LiAsF_6$, $LiSO_3CF_3$, $LIN(SO_2CF_3)_2$, $LIN(SO_2C_2F_5)_2$, $LIN(SO_2CF_3)(SO_2C_4F_9)$, and $LiC(SO_2CF_3)_3$. A lithium salt selected from these may be used alone. Alternatively, a mixture of at least two lithium salts selected from these may be used.

For the purpose of facilitating transfer of lithium ions and improving the output characteristics of the battery, at least one selected from the group consisting of the positive electrode 201, the electrolyte layer 202, and the negative electrode 203 may contain a nonaqueous electrolytic solution, a gel electrolyte, or an ionic liquid.

The nonaqueous electrolytic solution contains a nonaqueous solvent and a lithium salt dissolved in the nonaqueous solvent. Examples of the nonaqueous solvent include cyclic carbonic acid ester solvents, chain carbonic acid ester solvents, cyclic ether solvents, chain ether solvents, cyclic ester solvents, chain ester solvents, and fluorine solvents. Examples of the cyclic carbonic acid ester solvent include ethylene carbonate, propylene carbonate, and butylene carbonate. Examples of the chain carbonic acid ester solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. A nonaqueous solvent selected from these may be used alone. Alternatively, a mixture of at least two nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LIN(SO_2C_2F_5)_2$, $LIN(SO_2CF_3)(SO_2C_4F_9)$, and $LiC(SO_2CF_3)_3$. A lithium salt selected from these may be used alone. Alternatively, a mixture of at least two lithium salts selected from these may be used. The concentration of the lithium salt may be, for example, greater than or equal to 0.5 mol/liter and less than or equal to 2 mol/liter.

Regarding the gel electrolyte, a polymer material impregnated with a nonaqueous electrolytic solution may be used. Examples of the polymer material include polyethylene oxides, polyacrylonitriles, polyvinylidene fluorides, polymethyl methacrylates, and polymers having an ethylene oxide bond.

Examples of the cation contained in the ionic liquid include
(i) aliphatic chain quaternary salts such as tetraalkylammonium or tetraalkylphosphonium,
(ii) aliphatic cyclic ammoniums such as pyrrolidinium, morpholinium, imidazolinium, tetrahydropyrimidinium, piperazinium, or piperidinium, and
(iii) nitrogen-containing-heterocyclic aromatic cations such as pyridinium or imidazolium.

Examples of the anion contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2$, $N(SO_2CF_3)(SO_2C_4F_9)$, and $C(SO_2CF_3)_3^-$.

The ionic liquid may contain a lithium salt.

For the purpose of improving the adhesiveness between particles, at least one selected from the group consisting of the positive electrode 201, the electrolyte layer 202, and the negative electrode 203 may contain a binder.

Examples of the binder include polyvinylidene fluorides, polytetrafluoroethylenes, polyethylenes, polypropylenes, aramid resins, polyamides, polyimides, polyamide-imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinylpyrolidones, polyethers, polyether sulfones, hexafluoropolypropylenes, styrene-butadiene rubber, and carboxymethyl cellulose. Copolymers may also be used as binders. Examples of such a binder include copolymers of at least two materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of at least two selected from the above-described materials may be used as the binder.

For the purpose of enhancing the electron conductivity, at least one selected from the positive electrode 201 or the negative electrode 203 may contain a conductive auxiliary.

Examples of the conductive auxiliary include
(i) graphite such as natural graphite or artificial graphite,
(ii) carbon black such as acetylene black or Ketjenblack,
(iii) conductive fibers such as carbon fiber or metal fiber,
(iv) carbon fluoride,
(v) metal powders such as aluminum,
(vi) conductive whiskers such as zinc oxide or potassium titanate,
(vii) conductive metal oxides such as titanium oxide, and
(viii) conductive polymer compounds such as polyanilines, polypyrroles, or polythiophenes. To reduce cost, the conductive auxiliary of (i) or (ii) above may be used.

In this regard, examples of the shape of the battery according to the second embodiment include a coin type, a cylindrical type, a square type, a sheet type, a button type, a flat type, and a stacked type.

EXAMPLES

The present disclosure will be described below in more detail with reference to the examples.

Example 1

Production of Solid Electrolyte Material
Regarding raw material powders, LiCl and $NbOCl_3$ at a $LiCl:NbOCl_3$ molar ratio of 1:1 were prepared in a dry atmosphere having a dew point lower than or equal to −30° C. These materials were pulverized and mixed in a mortar so as to obtain a powder mixture. The resulting mixture was subjected to milling treatment for 24 hours at 600 rpm by using a planetary ball mill. In this manner, a powder of the solid electrolyte material according to Example 1 was obtained. The solid electrolyte material according to Example 1 had a composition denoted by $LiNbOCl_4$.

Evaluation of Ionic Conductivity

Figure 2:
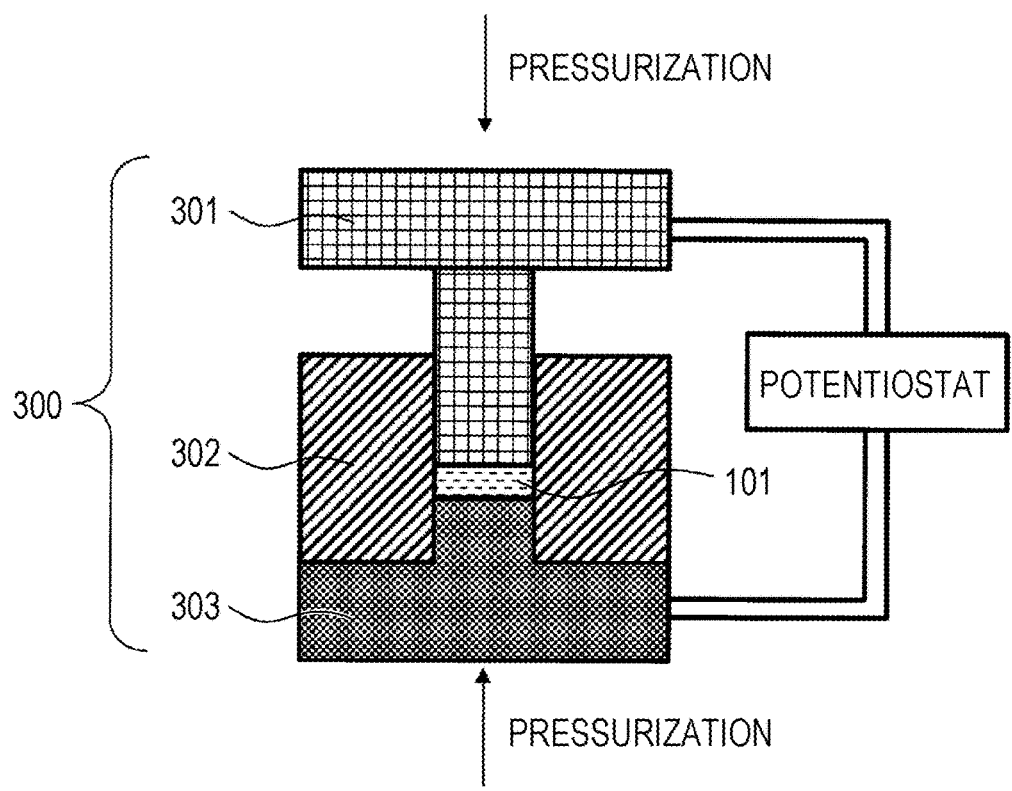
FIG. 2 is a schematic diagram of a pressure forming die 300 used for evaluating the ionic conductivity of a solid electrolyte material.

FIG. 2 is a schematic diagram of a pressure forming die 300 used for evaluating the ionic conductivity of the solid electrolyte material.

The pressure forming die 300 included a punch upper portion 301, a die 302, and a punch lower portion 303. The die 302 was formed of an insulating polycarbonate. Each of the punch upper portion 301 and the punch lower portion 303 was formed of stainless steel having electron conductivity.

The pressure forming die 300 illustrated in FIG. 2 was used, and the ionic conductivity of the solid electrolyte material was measured by using the method described below.

The solid electrolyte material powder according to Example 1 (that is, the solid electrolyte material powder 101 in FIG. 2) was placed into the pressure forming die 300 in a dry atmosphere having a dew point lower than or equal to −30° C. A pressure of 400 MPa was applied to the solid electrolyte material according to Example 1 by using the punch upper portion 301 and the punch lower portion 303.

The punch upper portion 301 and the punch lower portion 303 were connected to a potentiostat (VersaSTAT4 produced by Princeton Applied Research) incorporated with a frequency-response analyzer while the pressure was applied. The punch upper portion 301 was connected to a working electrode and a potential-measurement terminal. The punch lower portion 303 was connected to a counter electrode and a reference electrode. The ionic conductivity of the solid electrolyte material according to Example 1 was measured by using an electrochemical impedance measuring method.

Figure 5:
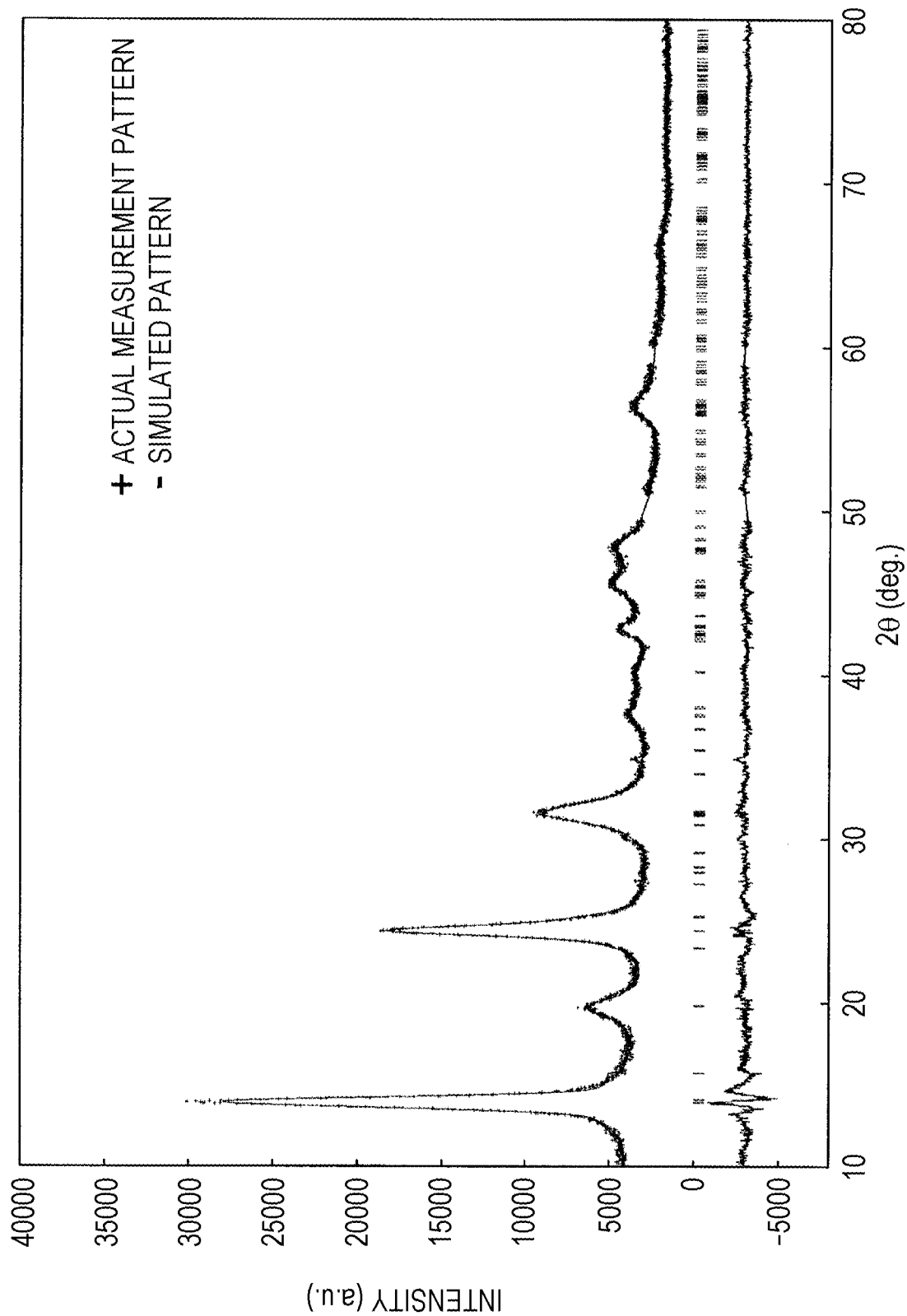
FIG. 5 illustrates the result of Rietveld analysis of a solid electrolyte material according to Example 1 when using the crystal structure illustrated in FIG. 3.

As a result, the ionic conductivity measured at 25° C. was 5.7 mS/cm. X-ray diffraction The solid electrolyte material according to Example 1 was subjected to X-ray diffraction measurement. An X-ray diffraction apparatus (MiniFlex 600, RIGAKU Corporation) was used for the measurement. The X-ray diffraction pattern of the solid electrolyte material according to Example 1 was measured in a dry atmosphere having a dew point lower than or equal to −45° C. Cu-Kα rays were used as the X-ray source. That is, the X-ray diffraction pattern was measured by using a θ-2θ method where Cu-Kα rays (wavelengths of 1.5405 Å and 1.5444 Å) were used as the X-rays. FIG. 5 illustrates the measurement result as "ACTUAL MEASUREMENT PATTERN".

Rietveld Analysis

Figure 3:
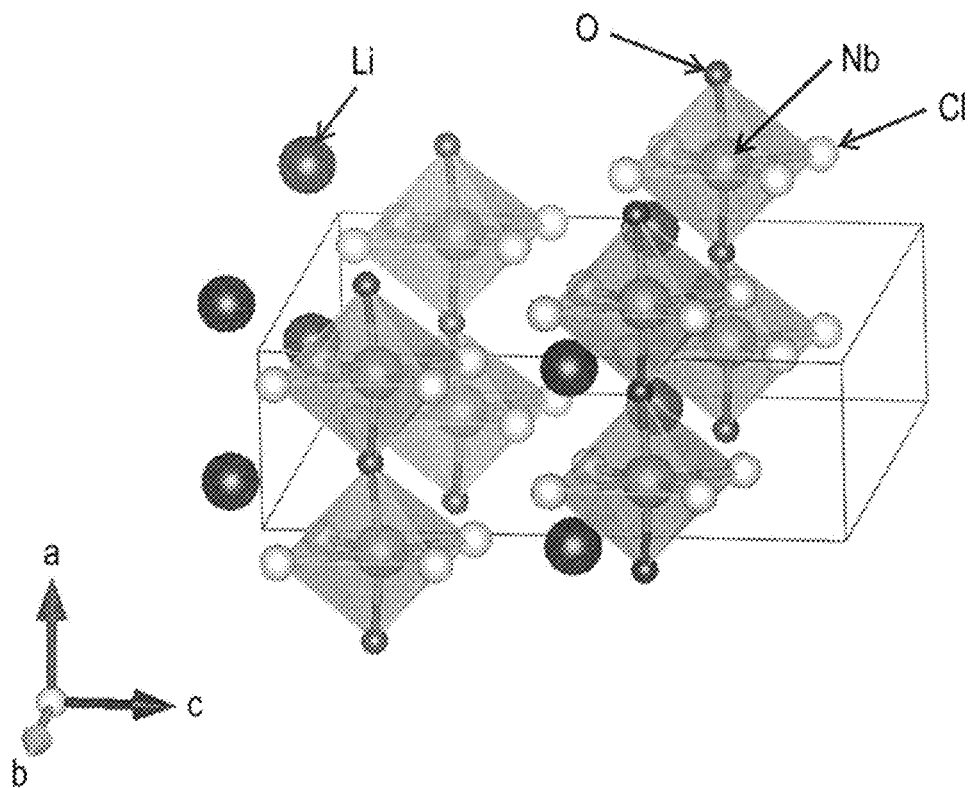
FIG. 3 illustrates a crystal structure of a solid electrolyte material having a composition denoted by $LiNbOCl_4$.
Figure 4:
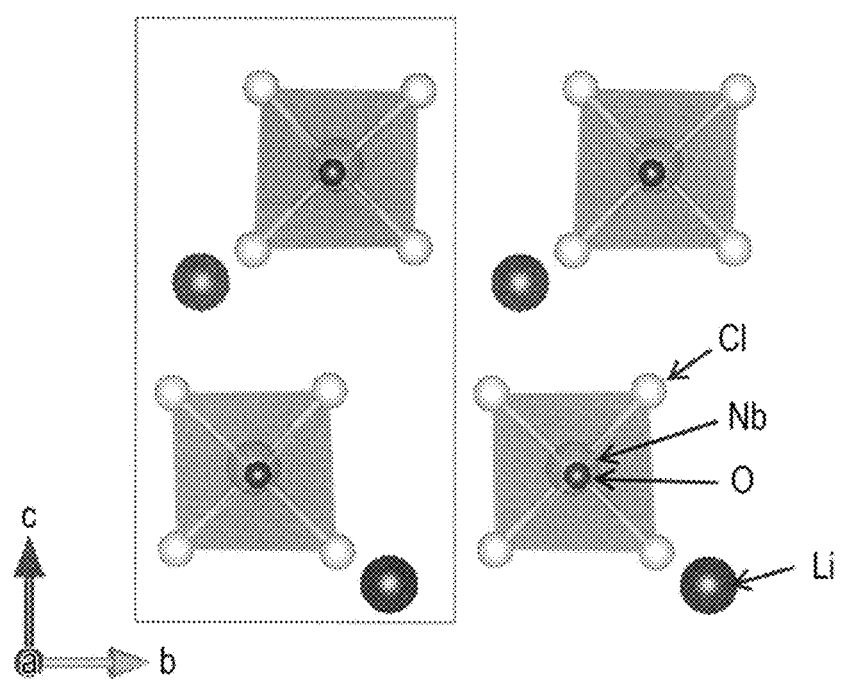
FIG. 4 illustrates the structure when the crystal structure in FIG. 3 is viewed in an a-axis direction.

The solid electrolyte material according to Example 1 was subjected to Rietveld analysis by using the crystal structure illustrated in FIG. 3 and FIG. 4. The solid line in FIG. 5 illustrates the analysis result as "SIMULATED PATTERN". The positions of the peaks calculated on the basis of the crystal structure illustrated in FIG. 3 were substantially in accord with those in the X-ray diffraction pattern of the solid electrolyte material according to Example 1. The $R_{wp}$ value was 4.76. Referring to, for example, Y. Li, C. Wang, H. Xie, J. Cheng and J. B. Goodenough, Electrochem. Commun., 2011, 13, 1289-1292, it can be said that the value is sufficiently low. Therefore, the solid electrolyte material according to Example 1 had the crystal structure illustrated in FIG. 3 and FIG. 4. That is, the solid electrolyte material according to Example 1 included a structure framework and an ion-conductive species, and the structure framework was composed of a one-dimensional chain in which a plurality of polyhedrons were linearly connected to each other while sharing a corner. The lowest line in FIG. 5 represents the difference in diffraction intensity between the actually measured value and the calculated value. The difference in diffraction intensity being small supports high reliability of the analysis result.

Comparative Example 1

The solid electrolyte material according to Example 1 was heat-treated at 300° C. for 3 hours in an argon atmosphere having a dew point lower than or equal to −60° C. In this manner, a solid electrolyte material powder according to Comparative example 1 was obtained.

The ionic conductivity of the solid electrolyte material according to Comparative example 1 was measured in the same manner as in Example 1. As a result, the ionic conductivity was $1.6 \times 10^{-4}$ mS/cm.

The solid electrolyte material according to Comparative example 1 was subjected to the Rietveld analysis by using the crystal structure of the solid electrolyte material according to Example 1. As a result, the $R_{wp}$ value was 28.4. Since the $R_{wp}$ value was large, the crystal structures were not assumed to be similar. That is, it is conjectured that the solid electrolyte material according to Comparative example 1 does not have the one-dimensional structure as illustrated in FIG. 3 and FIG. 4.

Evaluation of Activation Energy

The activation energy of the solid electrolyte material according to Example 1 was calculated by using a technique described in H. Chen, L. L. Wong and S. Adams, Acta Crystallogr., Sect. B: Struct. Sci., Cryst. Eng. Mater., 2019, 75, 18-33. Table 1 describes the calculated value.

The crystal structures of the solid electrolyte materials according to Examples 2 to 6 were derived in the manner described below.

Example 2

In the crystal structure of the solid electrolyte material according to Example 1, Cl was substituted with F. Subsequently, the crystal structure was optimized by using a first-principle calculation. The first-principle calculation was performed by using a PAW (Projector Augmented Wave) method based on the density functional theory. Regarding the optimization of the crystal structure, GGA-PBE was used for describing the electron density that expresses exchange-correlation term related to the interaction between electrons. GGA represents generalized gradient approximation. PBE represents Perdew-Burke-Ernzerhof.

Example 3

In the crystal structure of the solid electrolyte material according to Example 1, Cl was substituted with Br. Subsequently, the crystal structure was optimized by using the first-principle calculation. The first-principle calculation was performed under the same condition as in Example 2.

Example 4

In the crystal structure of the solid electrolyte material according to Example 1, Cl was substituted with I. Subsequently, the crystal structure was optimized by using the first-principle calculation. The first-principle calculation was performed under the same condition as in Example 2.

Example 5

In the crystal structure of the solid electrolyte material according to Example 1, Nb was substituted with Ta. Subsequently, the crystal structure was optimized by using the first-principle calculation. The first-principle calculation was performed under the same condition as in Example 2.

Example 6

In the crystal structure of the solid electrolyte material according to Example 1, Nb was substituted with P. Subsequently, the crystal structure was optimized by using the first-principle calculation. The first-principle calculation was performed under the same condition as in Example 2.

The activation energy of the solid electrolyte material according to each of Example 2 to Example 6 was calculated in the same manner as in Example 1. Table 1 describes the calculated value.

Comparative Example 2

Figure 6:
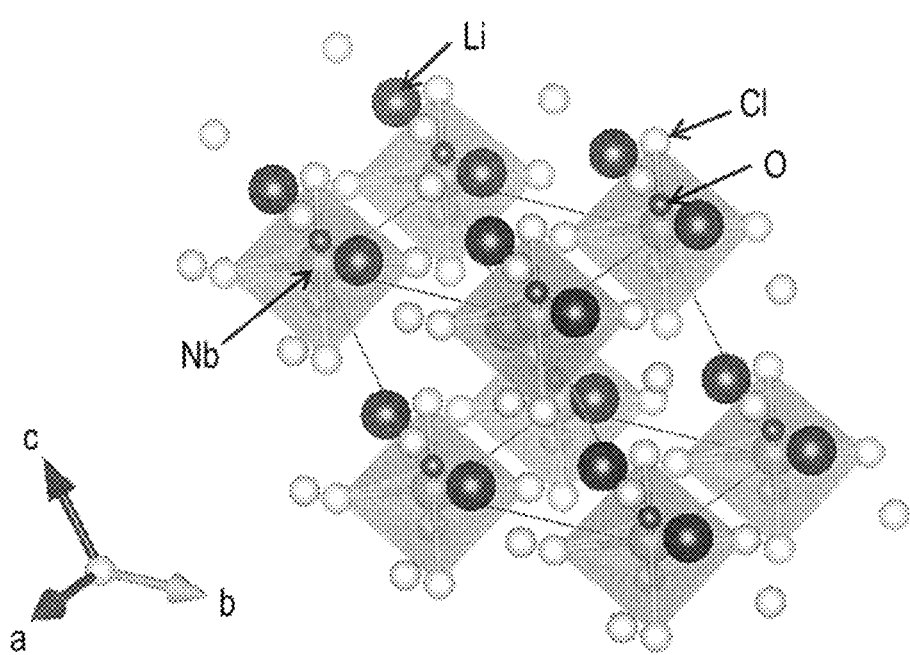
FIG. 6 illustrates the crystal structure of a solid electrolyte material according to Comparative example 2.

The crystal structure of $Li_2NbOF_5$ (mp-755505) was obtained from the first-principle calculation data base Materials Project. In the resulting crystal structure, F was substituted with Cl. Subsequently, the crystal structure was optimized by using the first-principle calculation. The first-principle calculation was performed under the same condition as in Example 2. Regarding the optimized crystal structure, the activation energy was calculated in the same manner as in Example 1. The optimized crystal structure is illustrated in FIG. 6. As is clear from FIG. 6, polyhedrons did not share a corner. Further, a plurality of polyhedrons did not form a one-dimensional chain. Table 1 describes the values of the activation energy of the solid electrolyte material according to Comparative example 2.

In Table 1, "One-dimensional activation energy" denotes "activation energy with respect to a one-dimensional conduction path". The same applies to "two-dimensional" or "three-dimensional".

TABLE 1

| | Composition | One-dimensional activation energy (eV) | Two-dimensional activation energy (eV) | Three-dimensional activation energy (eV) |
|---|---|---|---|---|
| Example 1 | $LiNbOCl_4$ | 0.08 | 0.21 | 0.21 |
| Example 2 | $LiNbOF_4$ | 0.20 | 0.34 | 0.34 |
| Example 3 | $LiNbOBr_4$ | 0.06 | 0.24 | 0.24 |
| Example 4 | $LiNbOI_4$ | 0.48 | 0.56 | 0.56 |
| Example 5 | $LiTaOCl_4$ | 0.05 | 0.24 | 0.27 |
| Example 6 | $LiPOCl_4$ | 0.16 | 0.33 | 0.33 |
| Comparative example 2 | $Li_2NbOCl_5$ | 0.75 | 0.75 | 0.83 |

Consideration

As is clear from Table 1, regarding the solid electrolyte material according to each of Examples 1 to 6 having a structure framework consisting of a one-dimensional chain, in particular, the one-dimensional activation energy is low. Consequently, the solid electrolyte materials according to Examples 1 to 6 have high ionic conductivity.

As is clear from comparisons between Example 1 and Comparative example 2, even when the same constituent elements are included, the activation energy increases unless the one-dimensional chain is included.

Regarding the two-dimensional conduction path and the three-dimensional conduction path in the solid electrolyte material according to each of Examples 1 to 6, since the ion-conductive species has to pass between one-dimensional chains, the two-dimensional activation energy and the three-dimensional activation energy are higher than the one-dimensional activation energy. However, the solid electrolyte materials according to Examples 1 to 6 have lower two-dimensional activation energy and three-dimensional activation energy than the solid electrolyte material according to Comparative example 2 not including the one-dimensional chain. The reason for this is conjectured that, in the solid electrolyte materials according to Examples 1 to 6, since polyhedrons are linearly connected to each other while sharing a corner, the filling ratio of the crystal structure is low and the ionic conduction path is wide.

The solid electrolyte material according to the present disclosure is used for, for example, all-solid lithium ion secondary batteries.

What is claimed is:

1. A solid electrolyte material comprising a crystal structure including a structure framework and an ion-conductive species,
    wherein the structure framework has a one-dimensional chain in which a plurality of polyhedrons are linearly connected to each other while sharing a corner,
    each of the plurality of polyhedrons contains at least one type of cation and at least one type of anion, and
    the polyhedron is composed of at least one cation selected from the group consisting of Nb, Ta, and P and at least one anion selected from the group consisting of O, F, Cl, Br, and I.

2. The solid electrolyte material according to claim 1, wherein the polyhedron is an octahedron.

3. The solid electrolyte material according to claim 1, wherein an element arranged at the corner is one type of anion.

4. The solid electrolyte material according to claim 1, wherein the polyhedron contains two or more types of anions.

5. The solid electrolyte material according to claim 1, wherein the ion-conductive species is a lithium ion.

6. The solid electrolyte material according to claim 1, wherein the structure framework has a one-dimensional chain in which the plurality of polyhedrons are linearly connected to each other while sharing just a corner.

7. The solid electrolyte material according to claim 1, wherein the structure framework consists of a one-dimensional chain in which the plurality of polyhedrons are linearly connected to each other while sharing a corner.

8. A battery comprising:
    a positive electrode;
    a negative electrode; and
    an electrolyte layer arranged between the positive electrode and the negative electrode,
    wherein at least one selected from the group consisting of the positive electrode, the negative electrode, and the electrolyte layer contains the solid electrolyte material according to claim 1.

* * * * *